(12) United States Patent
Chini et al.

(10) Patent No.: US 10,892,073 B2
(45) Date of Patent: Jan. 12, 2021

(54) HEATABLE MOTOR VEHICLE OPERATING LIQUID TANK AND METHOD OF PRODUCING THE HEATING DEVICE FOR IT

(71) Applicant: Röchling Automotive SE & Co. KG, Mannheim (DE)

(72) Inventors: Fabrizio Chini, Isera (IT); Ivan De Metri, Bolzano (IT); Luca Marini, Besenello (IT); Francesca Brunori, Leifers (IT)

(73) Assignee: Röchling Automotive SE & Co. KG, Mannheim (DE)

( * ) Notice: Subject to any disclaimer, the term of this patent is extended or adjusted under 35 U.S.C. 154(b) by 1063 days.

(21) Appl. No.: 14/941,091

(22) Filed: Nov. 13, 2015

(65) Prior Publication Data

US 2016/0138455 A1    May 19, 2016

(30) Foreign Application Priority Data

Nov. 18, 2014  (DE) .................... 10 2014 223 517

(51) Int. Cl.
*H01C 17/02* (2006.01)
*F01N 3/20* (2006.01)
(Continued)

(52) U.S. Cl.
CPC ............ *H01C 17/02* (2013.01); *F01N 3/2066* (2013.01); *H01C 1/142* (2013.01); *H01C 7/102* (2013.01);
(Continued)

(58) Field of Classification Search
CPC ......... F01N 2610/10; F01N 2610/1406; F01N 3/2066; F01N 2610/02; F01N 3/1486;
(Continued)

(56) References Cited

U.S. PATENT DOCUMENTS 2,018,512 A * 10/1935 De Laney .............. H05B 3/342
219/508
3,803,386 A *  4/1974 Rodrigues ............ A01K 63/065
119/245
(Continued)

FOREIGN PATENT DOCUMENTS

DE           3152305 C2   10/1982
DE     202007006636 U1    8/2007
(Continued)

*Primary Examiner* — Tu B Hoang
*Assistant Examiner* — Diallo I Duniver
(74) *Attorney, Agent, or Firm* — Rankin, Hill & Clark LLP

(57) ABSTRACT

A motor vehicle operating liquid tank, in particular for storing aqueous urea solution, with a tank shell surrounding a tank volume and with a tank opening extending through the tank shell, a planar heating device in the tank volume is provided with an electrical resistance heating track arranged sandwiched between two plastic films that oppose one another in a planar manner and encase the resistance heating track, the plastic films opposing one another in a planar manner and each have a layer of compatible, thermoplastic plastics at least on their surfaces facing one another which are connected to one another locally at least along a seam track surrounding the electrical resistance heating track, slot areas are provided inside this seam track in which plastic film sections lie opposite one another in an unconnected manner without the intermediate arrangement of a section of a resistance heating track between them.

26 Claims, 4 Drawing Sheets

(51) Int. Cl.
*H01C 17/28* (2006.01)
*H01C 1/142* (2006.01)
*H01C 7/102* (2006.01)

(52) U.S. Cl.
CPC ......... *H01C 17/283* (2013.01); *H01C 17/288* (2013.01); *F01N 2610/10* (2013.01); *F01N 2610/1406* (2013.01); *Y02A 50/20* (2018.01); *Y02T 10/12* (2013.01)

(58) Field of Classification Search
CPC . F01N 3/2896; F01N 3/20; F01N 3/10; F01N 3/00; F01N 3/206; F01N 3/2073; Y02A 50/2325; H01C 17/02; H01C 17/283; H01C 17/288; H01C 1/142; H01C 7/102; H01C 1/14; H05B 3/22; H05B 3/267; H05B 3/286; H05B 3/36; H05B 2203/029; H05B 2203/033; H05B 3/02; H05B 1/0236; H05B 3/0014; H05B 3/80; H05B 1/02; H05B 3/00; H05B 3/40; Y02T 10/24; F02M 31/12; F04B 23/025; F04B 53/20; F04C 2/084; B23P 19/00; B01D 35/18; B65D 81/18; B65D 88/12; F24H 9/12; F24H 1/10; F04D 13/086; F04D 13/024; F23D 11/448; B67D 5/62
USPC .......... 29/428, 611; 392/447, 449, 448, 498, 392/503, 497, 523, 543; 219/544, 546, 219/548, 552, 553, 260, 476, 202, 449, 219/523, 481, 510, 541, 205; 220/562, 220/592.28
See application file for complete search history.

(56) References Cited

U.S. PATENT DOCUMENTS

| | | | | |
|---|---|---|---|---|
| 4,371,777 | A * | 2/1983 | Roller | H05B 3/14 |
| | | | | 219/505 |
| 4,485,297 | A | 11/1984 | Grise et al. | |
| 4,652,726 | A * | 3/1987 | Femino | A47C 27/085 |
| | | | | 219/217 |
| 5,155,800 | A * | 10/1992 | Rezabek | H05B 3/283 |
| | | | | 219/523 |
| 5,432,322 | A * | 7/1995 | Ingram | A61F 7/007 |
| | | | | 219/528 |
| 8,586,895 | B2 * | 11/2013 | Haeberer | B65D 88/12 |
| | | | | 219/209 |
| 8,625,978 | B2 | 1/2014 | Potier et al. | |
| 2011/0120102 | A1 | 5/2011 | Hafner et al. | |
| 2013/0026156 | A1 | 1/2013 | Naylor et al. | |
| 2014/0138368 | A1* | 5/2014 | Verstraeten | H05B 3/12 |
| | | | | 219/202 |

FOREIGN PATENT DOCUMENTS

DE  102008011464 A1  9/2009
WO  WO-2013004692 A1 *  1/2013  ............... F24H 9/18

* cited by examiner

HEATABLE MOTOR VEHICLE OPERATING LIQUID TANK AND METHOD OF PRODUCING THE HEATING DEVICE FOR IT

The present invention relates to a motor vehicle operating liquid tank, in particular for storing aqueous urea solution, with a tank shell surrounding a tank volume and with a tank opening extending through the tank shell, wherein a planar heating device in the tank volume is provided with an electrical resistance heating track which is arranged sandwiched between two plastic films that oppose one another in a planar manner and encase the resistance heating track.

According to a modification of the present invention that falls under a common inventive concept, it also relates to a motor vehicle operating liquid tank, in particular for storing aqueous urea solution, with a tank shell surrounding a tank volume and with a tank opening extending through the tank shell, wherein a planar heating device is provided in the tank volume with an electrical resistance heating track sandwiched between two parallel plastic films encasing the resistance heating track.

BACKGROUND OF THE INVENTION

Operating liquids in motor vehicles, that are stored in tanks provided to this end and which can be removed continuously or discontinuously from the tank during the operation of the motor vehicle, threaten to solidify, depending on their chemical composition, under cold outdoor conditions to which the motor vehicle can be exposed.

In the case of aqueous urea solution such as is used in modern motor vehicles in so-called SCR systems for the selective catalytic reaction (SCR="Selective Catalytic Reduction") for exhaust gas purification, the solidification temperature at customary atmospheric outdoor conditions of approximately 1000 hPa atmospheric pressure is approximately −11° C. Such outdoor temperatures are readily achieved or even dropped below in many areas of the world at the particular time of winter.

In order to keep the operating liquids, in particular aqueous urea solution, in a motor vehicle ready for operation and consequently liquid, heatable operating liquid tanks were therefore suggested. A generic motor vehicle operating liquid tank is known from U.S. Pat. No. 8,625,978 B2.

This publication suggests, without citing further details, that the two films between which the resistance heating track is arranged be firmly connected to one another in order to protect the resistance heating track from the influence of aqueous urea solution. By way of example the publication cites a vulcanization as a possible connection method. Vulcanization can only be considered for a limited selection of material, namely, for rubber and rubber-based elastomers and polymers related to them.

The present invention has the problem of further improving the generics teaching.

The arrangement of the resistance heating track between two films, which is already known from the generic publication, achieves the advantage that the thermal energy given off by the resistance heating track can be given off as rapidly and completely as possible to the surrounding operating liquid because due to a lack of mass the plastic films have only a low intrinsic thermal capacity and due to lack of excessive thickness they also do not offer excessively high resistance to the passage of heat. Therefore, in the case of the films—particularly on account of the low material thickness—it is all the more important to have a careful screening of the resistance heating track from the influences of the operating liquid. Especially an operating liquid such as aqueous urea solution can have a strongly corrosive effect on customary resistance heating track materials such as metals or carbon.

Now, plastics counteract, as a function of the film thickness and of the particular selection of material, a diffusion of operating liquid components in the direction of thickness through the plastic films in a known and reproducible manner. The greatest uncertainty regarding the screening action that the two plastic films develop for the protection of the resistance heating track arranged between them therefore lies in the connection of the two films to one another.

SUMMARY OF THE INVENTION

In order to increase the protective action of the two films for the resistance heating track the present invention suggests according to a first inventive concept a tank of the initially cited type in which the plastic films of the heating device oppose one another in a planar manner and each have a layer of compatible, thermoplastic plastics at least on their surfaces facing one another which are connected to one another locally at least along a seam track surrounding the electrical resistance heating track, wherein slot areas are provided inside this seam track in which plastic film sections lie opposite one another in an unconnected manner without the intermediate arrangement of a section of a resistance heating track between them. The resistance heating track can be hermetically enclosed between the two plastic films with such a circumferential seam track that can be produced, for example, in a simple manner and with a high precision of reproducibility regarding seam quality and seam shape by a mirror welding.

Therefore, gas can be enclosed between the two plastic foils inside the volume closed off by the plastic films and the seam track in which volumes the resistance heating track is arranged so that components of operating fluid diffusing through one or both plastic films in the area of the resistance heating track do not immediately reach the resistance heating track but rather enter at first into the gas space of the slot areas formed between the films. As a result, the concentration of fuel components in the area between the plastic films, which is unavoidable and conditioned by the diffusion, rises only slowly since the fuel components diffusing through the plastic films are dissolved and diluted in the gas between the slot areas. Possible corrosion events can be delayed further as a result of this.

As a result of the suggested design of the heating device it can be constructed in a planar manner, i.e., with a low thickness and with comparatively large dimensions in comparison to the thickness of the heating device in the main extensions of the surface directions orthogonal to the direction of thickness.

It can be provided for the local, purposeful introduction of thermal energy into the tank volume that the resistance heating track forms at least two active areas with a higher heating track density per surface unit and at least one passive area with a lower heating track density per surface unit in its extended surface—that is, in its surface defined by two main directions of extent that are orthogonal to one another and their linear combinations. The transmission of heat between the resistance heating track and the tank volume then takes place substantially in the active areas. It can be provided for a further mechanical stabilization of the heating device that the plastic films in the passive area—or optionally in several passive areas if they are present—are connected without the intermediate arrangement of a section of a resistance heating track for forming connection points and/or connection webs with one another in a punctiform and/or linear manner.

Areas of the resistance heating track that have significant potential differences in operation can be bodily separated from another by plastic material by the formation of such connection areas, in particular of connection webs. Since corrosion is also driven by differences of potential, the tendency to corrode of the resistance heating track can be reduced at especially endangered positions by the formation of connection areas.

The connection points and/or connection webs formed in this manner can furthermore advantageously serve for the local, purposeful arrangement or even fastening of the heating device in the tank volume, in particular to the tank shell. It can be provided for this that the planar heating device comprises a fixing means for the relative fixing of the heating device to the tank shell at a connection point and/or at a connection web.

The fixing means can be projections. However, the fixing means are preferably openings through which projections or clips can penetrate so that the heating device can be positively fastened on the tank shell by the fastening means preferably constructed as through openings.

Since the slot sections of the two plastic films define a volume between themselves in which a resistance heating track or a section of it can be readily received, it is preferred that at least one active area of the resistance heating track is arranged in a slot section of the plastic films, whereby preferably several slot sections are provided in each of which an active area is arranged. At the same time connection points and connection webs that stiffen the heating device and further its fixing can be constructed in the passive areas.

The connection points and/or connection webs can also be produced by mirror welding, advantageously with the same welding tool with which the seam track surrounding the resistance heating track is also produced.

However, the entire resistance heating track does basically not have to be arranged in slot sections of the plastic films that are connected to each other. For example, it can be provided for an improved fixing of the position of the resistance heating track relative to the two plastic films that the plastic films are connected to one another over their entire surface at least in a connection section with a resistance heating track section between themselves, preferably completely with the exception of those sites of the connection section at which a resistance heating track section is provided. The plastic films are completely connected to one another with the exception of those sites at which a section of the resistance heating track has been placed between the plastic films in the connection section that, however, does not have to extend over the entire area located inside the seam track, so that the plastic films cannot contact one another there in order to produce a connection.

Note for clarification that a small nip running along the resistance heating track can remain depending of the shape of the cross section of the resistance heating track to one or both sides of it in the seam surface of the two plastic surfaces although the plastic films are otherwise completely connected. This nip can remain, for example along the resistance heating track due to the elasticity of the material of the plastic films. Such an unavoidable nip, that has only a slight cross-sectional surface in comparison to the cross-sectional surface of the resistance heating track, should not change anything in the sense of the present application about the evaluation of a full-surface connection of the plastic films.

As an alternative to the initially cited solution the two plastic films can be arranged parallel to one another and be connected to one another over their entire surface over the entire extent of the surface of the resistance heating track and for the protection of the same extending radially over the latter. The resistance heating track is then completely fixed between the two plastic films by their connection to one another. Therefore, a seam position of the two plastic films adjacent to one another is located for each cross section of the resistance heating track in a sectional plane orthogonal to the local direction of the course of the heating track, provided that the distance between two sections of the resistance heating track is so great that the nips possibly located adjacent to the particular heating track section cannot make a connection to a common hollow space.

Consequently, the above-cited problem is also solved by a motor vehicle operating liquid tank, in particular for the storing of aqueous urea solution with a tank shell surrounding a tank volume and with a tank opening extending through the tank shell, wherein a planar heating device with an electrical resistance heating track is provided in the tank volume which tank is arranged sandwiched between two parallel plastic films encasing the resistance heating track, wherein it is provided according to the invention that the plastic films each comprise a layer of compatible thermoplastic plastics at least on their surfaces facing one another which are connected to one another over their entire surfaces in a connection section with the complete inclusion of the resistance heating track with the exception of those sites of the connection section at which a resistance heating track section is provided.

The entire-surface connection of the two plastic films to one another described here can be achieved by a welding method such as, for example, an infrared welding method in which thermal energy can be simultaneously introduced over the entire intended seam surface, or by a lamination method, in particular a vacuum-supported lamination method.

It is conceivable in an embodiment that can be manufactured in a simple and economical manner that at least one of the plastic films, preferably each of the two plastic films consists only of one layer of thermoplastic plastic.

As an alternative to the above, in order to avoid undesired thermal deformation of one or both of the two plastic films, it is conceivable that one plastic film is constructed as a multilayer film laminate whose thermoplastic plastic layer facing the other plastic film and lying on the outside relative to the laminate has a melting and/or softening point that is lower, under otherwise the same conditions, than another layer, preferably than all other layers of the film laminate. In this case it is sufficient to soften only the thermoplastic plastic layer lying on the outside for the connection to the other plastic film in that the temperature of the plastic film laminate is elevated above the softening and/or melting temperature of this layer but not so high that softening temperature and/or melting temperature of the at least one other plastic layer of the laminate would be achieved. Therefore, the shape of the at least one other plastic layer, whose softening temperature and/or melting temperature is not reached, remains preserved, which leads to an improved stability of the shape of the plastic layer during and after the connection to the particular other plastic layer. Both plastic layers are preferably constructed as the above-designated multilayer film laminate.

The thickness of a plastic film is preferably between 100 and 300 μm, independently of whether the plastic film is constructed as one layer or as a multilayer film.

It can basically be provided that the single layers of a plastic film can be connected to one another by adhesion promoters; however, it is conceivable in order to avoid unnecessary layers of adhesion promoters that at least the thermoplastic plastic layer located directly on the outside and facing the particular other plastic film is formed by an adjacent, other plastic layer connected to the latter and consisting of plastic material that is compatible as concerns the material of the outside thermoplastic plastic layer, which plastic material has a higher melting point and/or softening point, with otherwise the same conditions, than the plastic layer lying on the outside and facing the particular other plastic film. All plastic layers participating in a plastic film constructed as a multilayer film laminate are formed from compatible plastic material.

However, it proved to be sufficient as regards the screening action on the one hand and a sufficient heat passage per time unit on the other hand that the plastic film has exactly two layers. In order to improve the screening action for screening the resistance heating track against influences from operating liquid components diffusing through the plastic film, it can be provided that a metallic layer, for example an aluminum layer, is provided between two plastic layers. This metallic layer can be less than 20, preferably less than 10 µm thick. Alternatively or additionally, a layer of ethylvinyl alcohol, PVDC or of some other suitable film material can be provided as another increase of a screening action for forming a gas barrier (water vapor is also considered as gas here) on the multilayer film laminate of a plastic film. The plastic film preferably comprises only exactly the two plastic layers.

The heating device as discussed herein is preferably arranged on the bottom of the tank, which is provided in the finished, assembled state on the geodetically deepest area of the tank. In order to make the most complete emptying of the tank possible, a discharge opening of the motor vehicle operating liquid tank described here is preferably arranged running through the bottom of the tank.

In order to keep the operating liquid not only liquid but also ready for operating in the tank according to the invention discussed here, that is, liquid in the vicinity of the discharge opening, the heating device, the discharge opening or a device cooperating with the discharge opening for the removal of operating fluid, for example, a suction device or the like, is arranged in a surrounding manner. The planar heating device preferably has an opening running through it that is also preferably completely surrounded by the two plastic films and the electrical resistance heating track. The device cooperating with the discharge opening can be arranged in the through opening of the heating device. The electrical heating device preferably has a disk-like shape with a through opening in the "disk" so that a seam track surrounding the resistance heating track runs not only radially outward but for sealing purposes also at the edge closer to the discharge opening radially inward around the resistance heating track.

The planar heating device preferably extends at an angle of approximately 60 to 90° relative to the direction of flow on the discharge opening or on the discharge connection of the tank. The direction of the discharge flow of the operating liquid is as a rule identical with the direction of the action of gravity so that gravity can at least support the removal of the operating liquid.

Another potential weak point of the heating device which can be attacked in a damaging manner by components of the operating liquid are the connections of the electrical resistance heating track on their electrical energy supply. For this, as a rule electrical lines must be run through at least one of the plastic films. In order to render this weak point as safe as possible, an advantageous further development of the present invention provides that electrical connection lines that run through or pass one of the plastic films to supply the resistance heating track with electrical energy are run through an insulating body comprising thermally softenable plastic connected directly to the perforated or circumvented plastic film and running away from the latter.

A circumvention of the plastic film can take place in that one or both plastic films do not extend past a connection area of the resistance heating track and that the connection area projects, for example from the plastic film packet.

The insulation body can be advantageously designed in a simple and rapid manner as an injection-molded construction part that is injected directly on the perforated or circumvented plastic film and therefore has a connection with the latter in which both have the same substance. As a result of this connection in which both have the same substance a diffusion attack by operating liquid components on the connection site between connection lines and heating track can be very largely excluded. The insulation body can be constructed to be sufficiently thick to avoid a diffusion to the connection sites without hindering a transfer of heat from the heating track to the operating liquid, since it is as a rule sufficient to provide the insulation body locally only in the area of the connection sites while the remaining, planar extension of the heating device only has the comparatively thin plastic films around the heating track.

In order to fix the connection lines as well as possible mechanically, it is furthermore advantageous if the insulation body coats at least one section of the connection lines in the vicinity of the heating device or contacts it in the hardened state. The insulation body is preferably solidly constructed.

As an alternative to a solid, one-piece injection molded structural part the insulation body can also be composed of two or more partial bodies. Each partial body can be formed for its part from injection-molded structural parts. At least one partial body can be constructed as a partial shell body which is located at a distance from the connection lines surrounded by it and protects them in an encasing manner from the influence of the operating liquid located during operation outside of the insulation body.

A polyolefin, in particular polypropylene or a hot adhesive ("hot melt") compatible with the material of the perforated plastic film proved to be especially resistant to the operating fluid of an aqueous urea solution preferred here as a thermally softenable plastic of the insulation body. Basically, every plastic compatible with the material of the perforated plastic film can be used in the framework of the present invention for producing the insulation body.

In order to protect the connection lines as much as possible over their entire extended length in the tank volume from the influences of the operating liquid, it is furthermore advantageous if the insulation body is connected to the tank shell by its end area remote from the heating device. Then, the insulation body can also be firmly connected to the tank shell, e.g. by adhesion and/or welding and/or screws. A wall of the isolation body can even form a wall section of the tank shell. In this case the insolation body can be inserted with an insert section into a recess of the tank shell formed in accordance with the shape of the insert section or can be set on the shell and connected to the tank shell. At least a part of the insert section can then form an outside wall section of the tank shell.

According to another advantageous further development of the present invention the tank shell can comprise electrical line sections running through it whose longitudinal ends projecting into the tank volume are also surrounded by the insulation body.

Alternatively, a plug directly associated with the planar heating element can be formed with the insulation body and can be connected to contact lines that penetrate the tank shell from the outside to the inside of the tank volume. For example, connection pins can attached in an electrically conductive manner on connection areas of the resistance heating track, e.g. by riveting and/or soldering. The pins firmly connected in this manner to the connection areas of the resistance heating track can for their part be surrounded by a shell-shaped or solid insulation body. The insulation body preferably also surrounds the connection areas of the resistance heating track in order to protect it from operating fluid. If the connection areas are constructed on longitudinal ends of line areas that project from a main surface of the heating element in a track that is narrow in comparison to the main surface of the heating element, the plug, that is arranged as above formed directly on the connection areas by injection molding or by the assembly of finished injection molded parts, can be moved relative to the heating element with comparatively low forces and brought into a connection orientation in which the plug can be readily pushed onto contact lines provided in the tank shell.

Alternatively the section of the insulation body forming the plug can be the previously cited insert section with which the insulation body can be inserted into a recess of the tank shell or on such a recess and connected to it preferably under formation of an outside wall section of the tank shell. In this case cables in the insulation body for supplying energy to the heating device can be eliminated. The previously cited connection pins directly connected to connection areas of the heating track can be directly contacted in the finished assembled state on the outside of the tank shell by an energy supply line, for example, by establishing a plug and socket connection.

The tank shell can be constructed with the injection molding method or also in the blow molding method. As a rule the tank shell consists of two or more shell parts.

In order to screen the connection lines themselves in addition to or alternatively to the insulation body from an attack of operating liquid components influencing their function it can also be provided that electrical connections that extend through one of the plastic films for supplying the resistance heating track with electrical energy are encased with an insulation at least in a line section located in the tank volume which comprises at least on its outer side a material compatible with a material of the penetrated plastic film.

Since in particular aqueous urea solution can act aggressively on metal and metallic structural components, it can be provided for the further protection of the connection lines that the connection lines have at least in a line section located in the tank volume a common extra insulation on top that surrounds the individually insulated connection lines and their individual insulation and which comprises at least on its outer side a material that is compatible with a material of the perforated plastic film and/or of the insulation body.

Furthermore, a space remaining between the extra insulation on top and the individual insulations of the connection lines can be filled with a filler material in order to screen a line section of the connection lines which is located in the tank volume with another protection against diffusing components of operating liquid. It is also advantageous here if the filler material is compatible with at least one material of the perforated plastic film and/or of the insulation body in order to have the possibility of welding the filler material to the plastic film and/or to the insulation body and to avoid in this manner a possibly present slot space between the plastic film and the longitudinal end of the insulation.

A polyolefin, in particular polypropylene or an ethylene-propylene-diene rubber (EPDM) proved to be especially resistant to aqueous urea solution, for which reason one or both of these plastics is/are preferred as material for the individual insulation and/or the extra insulation on top and/or for the filling material. Basically, however, according to the present invention every material compatible with the plastic of the plastic foils can be used.

According to another concept of the present invention connected to the previous ones by a common inventive idea, a heating device for a motor vehicle operating liquid tank such as was described above can be produced by a mirror welding comprising the following steps:
  Providing a first plastic film,
  Providing a second plastic film,
  Arranging a resistance heating track between the two plastic films, and,
  Mirror welding the two plastic films with a device for mirror welding and producing in this manner a seam track running around the outside of the resistance heating track.

Alternatively or additionally, the method for producing a heating device can comprise the following steps:
  Providing the first plastic film,
  Providing the second plastic film,
  Arranging a resistance heating track between the two plastic films,
  Fixing the group of the first and the second plastic film with the resistance heating track arranged between them between two parallel plates,
  Heating the fixed group and thereby softening or melting at least one thermoplastic plastic layer of a plastic film, which layer is in the direct vicinity of the particular other plastic film,
  Compressing the plates,
  Allowing the fixed group to cool off, and
  Removing the fixed group from the area between the plates.

The plates themselves can be heatable, for example by electrical resistance heating or by passing a fluid through with an elevated temperature.

The heating of the fixed group preferably takes place between the plates with an infrared radiator as heat source. Glass plates can then be used as plates.

Again, as an addition or an alternative the method for producing a heating device can comprise the following steps if areas of the plastic films are to be connected to each other by lamination:
  Providing the first plastic film,
  Providing the second plastic film,
  Arranging a resistance heating track between the two plastic films,
  Evacuating the area between the plastic films,
  Raising the temperature of the plastic films over the softening and/or melting temperature of at least one thermoplastic plastic layer of a plastic film, which layer makes contact with the particular other plastic film,
  Allowing the group to cool off.

The naming of the method steps should not indicate any sequence unless it is obligatory for logical reasons even though a sequence in the named order is preferred.

However, it is explicitly pointed out that at first the resistance heating track can be encased by a butt-welding method with heat reflectors between the plastic films made available by producing a seam track surrounding the resistance heating track, whereupon a section of the area surrounded by the seam track or of the total area can be used to produce a connection over the entire surfaces of the plastic films to one another in this section by the above-described plate welding method, preferably with an infrared heat source, or by the described lamination method under the action of a vacuum.

These and other objects, aspects, features, advantages and developments of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein.

DESCRIPTION OF PREFERRED EMBODIMENTS

Figure 1:
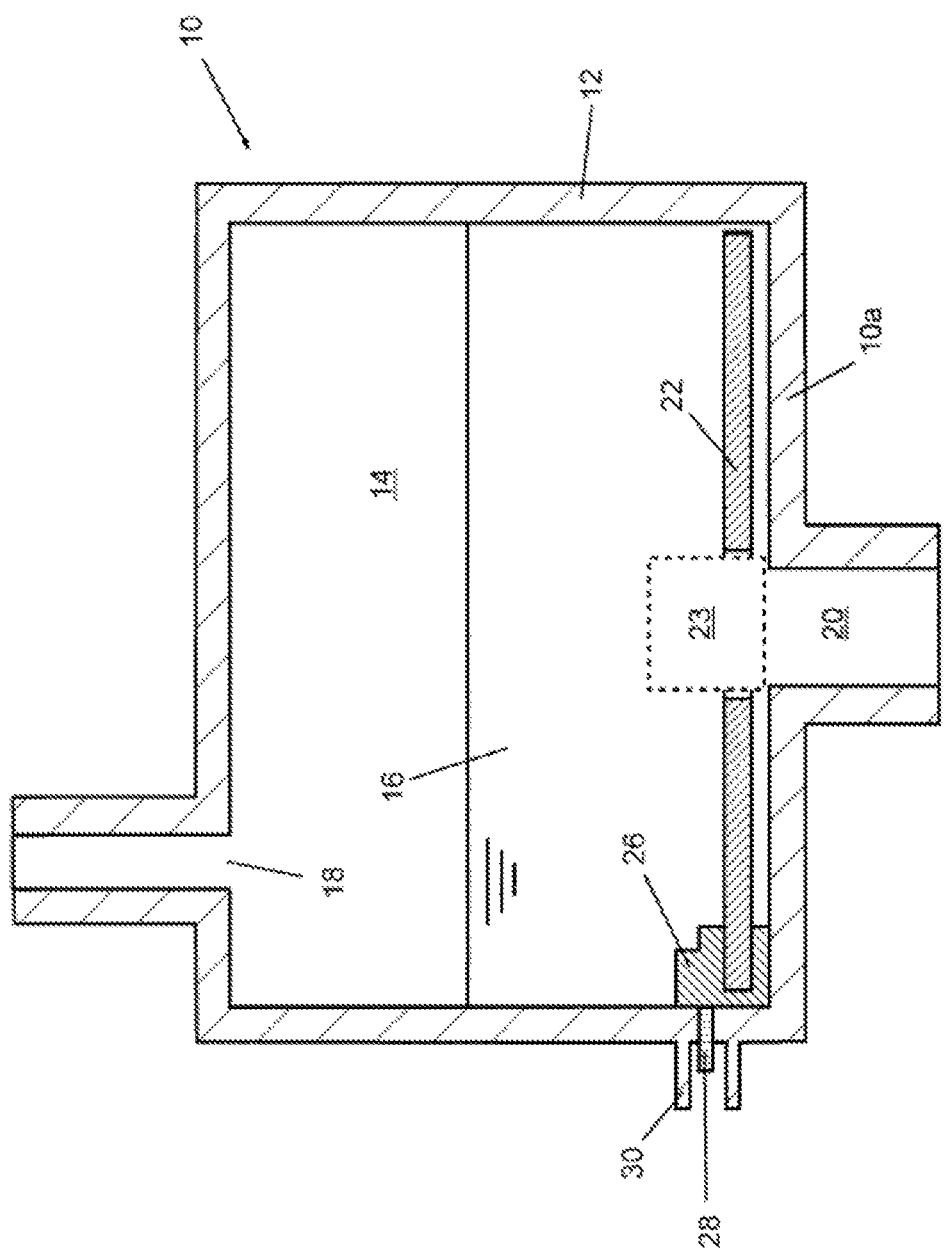
FIG. 1 shows a rough schematic cross-sectional view of a motor vehicle operating liquid tank in accordance with the invention with a heating element.

Referring now to the drawings wherein the showings are for the purpose of illustrating preferred and alternative embodiments of the invention only and not for the purpose of limiting the same, FIG. 1 shows a motor vehicle operating liquid tank in accordance with the invention designated in general by 10 shown only in a rough schematic manner. The tank 10 is shown in a longitudinal sectional view.

The tank 10 comprises a tank shell 12 that can be composed of several partial shells. These partial shells can be produced, for example in the injection-molding method or in the blow molding method.

The tank shell 12 surrounds a tank volume 14 in which an operating liquid 16, e.g. an aqueous urea solution is received such as is used for a selective catalytic reaction for the purification of exhaust gas in motor vehicles with internal combustion engines. The liquid level of the operating liquid 16 orthogonal to the plane of the drawing in FIG. 1 is orthogonal to the direction of the action of gravity.

The motor vehicle operating liquid tank 10 can be filled through a tank opening 18. The operating liquid can be removed through a removal opening 20 from the tank volume 14. Filling pieces and removal pieces or filling lines or removal lines can be connected to the tank opening 18 and the removal opening 20 in a known manner. A device 23 can be provided above the removal opening 20 that cooperates with it to remove operating liquid 16 from the tank volume 14, e.g. a part of a suction device or the entire suction device or the like.

A planar heating element 22 is provided preferably in the area of the tank bottom 10a in the tank volume 14 which element advantageously extends substantially parallel to the tank bottom 10a and has a significantly greater dimension in its extended surface, which runs orthogonally to the plane of the drawing of FIG. 1, than in its direction of thickness lying in the plane of the drawing of FIG. 1.

The heating element 22 is formed from a plastic film sandwich in a manner already known from the prior art, in which an electrical resistance heating track 24 (see FIGS. 2, 3 and 4) is received between two plastic films 34 and 36. For reasons of simplification of the view no resistance heating track is shown in FIG. 1.

The heating device 22 can cooperate at a position with an insulation body 26 in which electrical connection lines are run to the electrical resistance heating track. The insulation body 26 can be produced, for example by extrusion-coating the film sandwich of the heating embodiment 22 in the injection-molding method from thermoplastic material.

In order to simplify the supplying of electrical energy of heating device 22 an electrical contact line 28 can be run through the tank shell 12. Even this electrical contact line 28 can be cast during the production of the tank shell or one of its partial shells in the injection-molding method into it by inserting the contact line material projecting through the tank shell 12 into it. A maximum density of the tank shell 12 at the position of the leading through of the electrical contact line 28 makes this available.

A socket 30 for receiving an electrical plug connection can also already be constructed in the tank shell 12.

Alternatively, the socket 30 can be constructed on the insulation body 26 and be connected to the tank shell under formation of an outer wall section of the tank shell 12, which section comprises the socket 30, by arranging the insertion section of the insulation body 26, which section carries the socket 30, in or on a recess extending through the tank shell 12 and by joining the insertion section and the tank shell 12 under the formation of a tight connection, optionally by positioning a seal between them.

Figure 2:
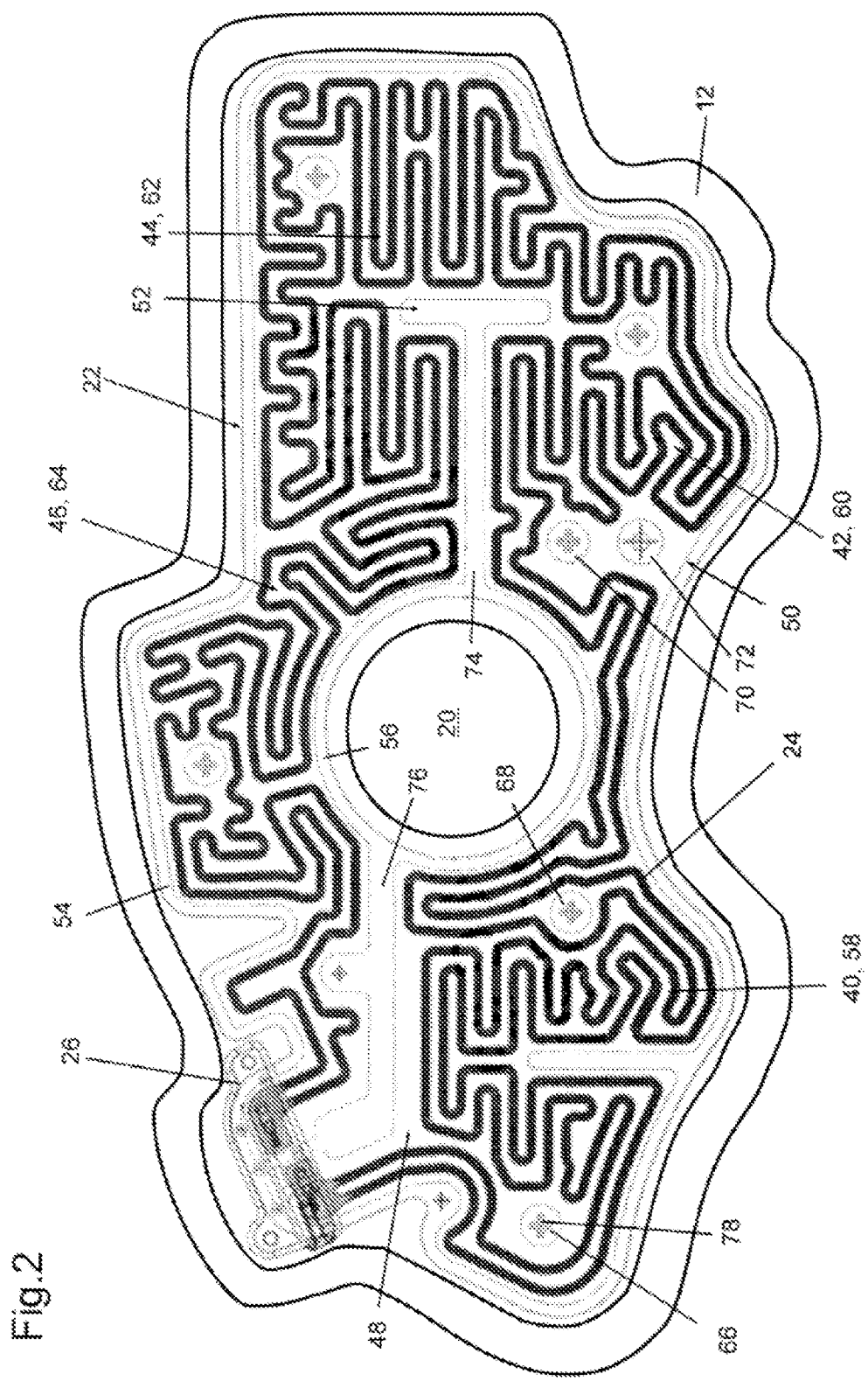
FIG. 2 shows a top view onto the bottom of the operating liquid tank of FIG. 1 covered with a heating element.

FIG. 2 shows a top view onto the tank bottom 10a of the tank in FIG. 1, which tank bottom is covered by the heating element 22. The cut tank shell 12 is not shaded.

It can be readily recognized that the heating element 22 covers almost the entire bottom of the tank 10. The electrical resistance heating track 24 is placed in a meandering shape in order to enlarge the heating surface.

Figure 3:
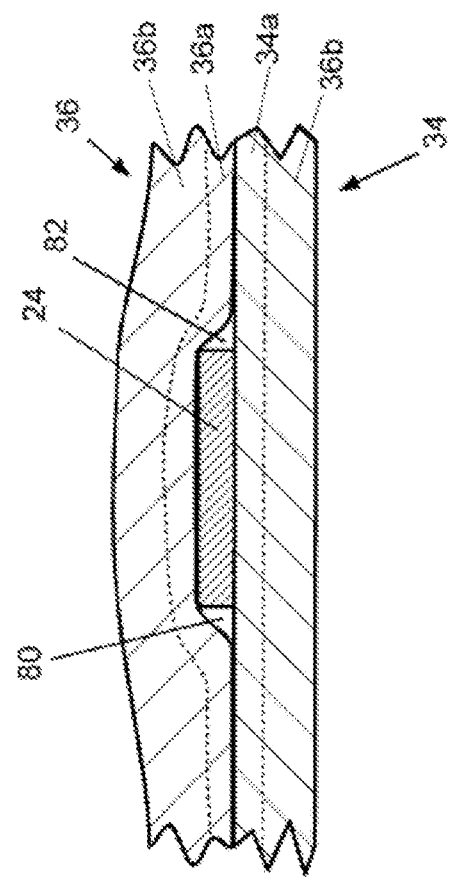
FIG. 3 shows a cross-sectional view through the heating element in a sectional plane orthogonal to the local direction of the course of the resistance heating track.
Figure 4:
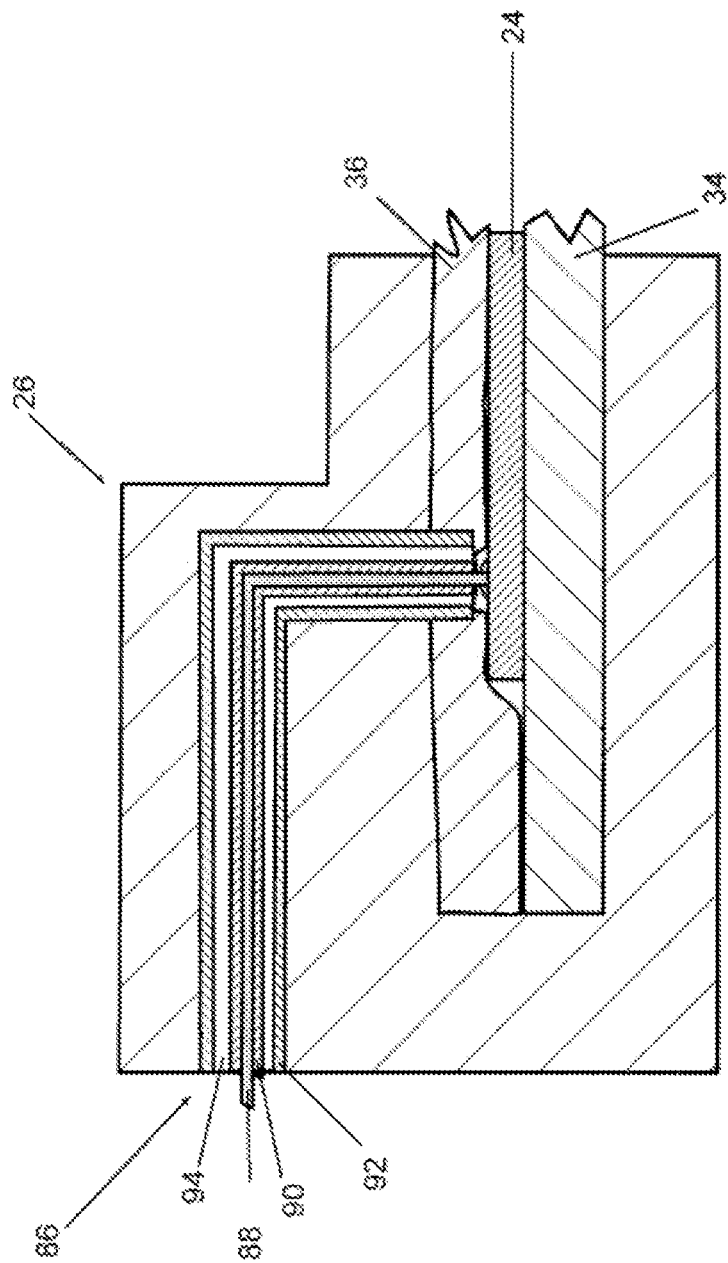
FIG. 4 shows a cross-sectional view through the heating element with an insulation body injected on it for producing an electrical connection of the heating element to a current supply.

The electrical resistance heating track 24 can be formed by a separately formed electrical conductor which can be placed between the plastic films 34 and 36 (see FIGS. 3 and 4). The conductor can be photochemically produced or cut out of a conductor film. However, the electrical resistance heating track 24 can also be printed on the film 34, for example, in the screen printing method.

Active areas 38, 40, 42 and 44 with a higher heating track density are made available by the meandering laying of the electrical resistance heating track 24. Passive areas 48, 50 and 52 are also provided in which the surface density of the electrical resistance heating track per surface unit is less than in the previously cited active areas. In addition to the explicitly cited active and passive areas provided with reference numerals the resistance heating track 24 also shows other active and passive areas.

The active protection of the electrical heating track 24 against influences from the operating liquid 16 is decisive for the long service life of the operating liquid tank 10 suggested here. Precisely when an aqueous urea solution is concerned, components from the liquid 16 can diffuse through plastics and develop their damaging action, for example, in the form of corrosion, on the resistance heating track 24.

More possibilities for screening the electrical resistance heating track 24 against influences of the operating liquid 16 are suggested here.

According to a first concept of the present invention the films 34 and 36 can be locally welded to one another in a method of mirror welding in order to prevent a penetration of operating liquid between the two films 34 and 36. Therefore, a seam track 54 can be produced surrounding the electrical resistance heating track 24 on the outside by the method of mirror welding, which seam track can not only be simply and reliably produced but also secures the seam slot produced between the two thermoplastic plastic films 34 and 36 reliably and for a long time against a diffusion of operating liquid components. The width of the seam track 54 can be selected in an appropriate manner by shaping the tool for mirror welding.

The present heating device 22 has the special advantage that it surrounds the removal opening 20 and the device 23 of the tank 10 which cooperates with it to remove operating liquid 16 and therefore allows the operating liquid 16 to be kept liquid directly at the removal site. Therefore, a radially inner seam track 56 is also constructed by the suggested method for mirror welding which track protects the heating track 24 like the seam web 54 running around radially on the outside, but in contrast to the latter protects the heating track from being reached by operating liquid 16 from the removal opening 20.

Slot areas can be provided between the two seam tracks 54 and 56 in which the plastic films 34 and 36 oppose one another in a non-connected manner with the heating track 24 positioned between them. The slot areas area in particular present where the heating track is placed especially densely per surface unit, therefore preferably in the active areas 40, 42, 44 and 46 of the heating track 24. The slot areas are designated here with 58, 60, 62 and 64.

The entire film surface located between the two seam tracks 54 and 56 can be but does not have to be present in a non-connected manner as a slot area. Punctiform and web-shaped seam connections can be formed between the films 34 and 36 for the physical separation of areas with different electrical potential, for stiffening the heating device 22 and especially for facilitating its fastening on the tank shell 12, in which the plastic films 34 and 36 are also connected to one another, as is also the case along the seam tracks 54 and 56. The connection points, see, for example connection points 66, 68, 70 and 72 and the connection webs 74 and 76 serve not only for the stiffening but can also carry fixing means such as cross-shaped openings through which fastening pins can be run. Refer by way of example to the cross-shaped opening 78 at connection point 66.

It is advantageous for a special stiffening if the connection webs 74 and/or 76 run, as in the example shown, starting from one of the seam tracks 54 or 56 into the surface of the heating device. In the present example the connection webs 74 and 76 start from the radially inner seam track 56.

However, as an alternative or addition to the method of mirror welding the films 34 and 36 can also be connected to one another in a planar manner by a surface welding method so that they are connected section-by-section everywhere where no resistor heating track 24 prevents a direct contact of the two plastic films 34 and 36.

A planar connection of the two plastic films to one another can be produced in that an arrangement of the heating track 24 arranged in a sandwich-like manner between the films 34 and 36 is fixed between two plates and that the plates are loaded with force toward one another in order to generate a seam pressure. Furthermore, the plastic films consisting of thermoplastic plastic are heated here so that at least the boundary surfaces of the plastic films contacting one another soften and melt together. The heating can take place by heating the plates or by irradiating the films by the plates, for example, with the aid of an infrared radiation source.

As a result, the film composite with heating track 24 arranged intermediately then looks in its cross section as is shown in FIG. 3. As a result of the surface tension, small nip areas 80 and 82 can remain on both sides of the heating track 24 in which the films 34 and 36 remain non-connected. As FIG. 3 shows, such nip areas 80 and 82, when they occur, are, however, significantly smaller in their cross-sectional surface 10 than the cross-sectional surface of the heating track 24 so that such nips 80 and 82 are negligible. The films 34 and 36 should therefore be considered to be connected to one another in the sense of the present application even given the occurrence of such nips 80 and 82.

Polyolefin films, in particular polypropylene films proved to be especially resistant to aqueous urea solutions.

In order to avoid an undesired thermal distortion by the joining of the two films, the films 34 and 36 can be constructed with multilayers, wherein the outer layers 34a and 36a of both films 34 and 36, which layers come in contact with one another for the joining, should be formed from compatible material, preferably from polypropylene for the above-cited reasons.

At least one other, preferably all other layers 34b and 36b of each film 34 and 36 have a higher softening- and/or melting point than outer layer 34a and 36a of the next other film so that for the joining of the two films the films only need to be heated to a temperature that is above the softening- and/or melting point of the outer layer 36a or 34a facing the particular other plastic film 34 or 36 but below the melting- and/or softening point of the at least one other layer 34b and 36b of the plastic films 34 and 36. Therefore, the at least one layer 34b and 36b with a higher melting- and/or softening point can ensure a true shape for a plastic film 34 and 36 during the joining while the outer layer 34a or 36a with a lower softening- and/or melting point enters a secure seam connection with the particular other plastic film 36a or 34a.

FIG. 4 a shows a rough schematic view of the electrical connection of the heating device 22 to an electrical energy source.

To this end the films 34 and 36, which hold the heating track 24 between themselves, can be locally encompassed by an insulation body 26, for example, by extrusion coating with the injection molding method. The insulation body 26 can be constructed to this end from a thermoplastic material or a hot melt that is compatible at least with an outer layer of the plastic films 34 and 36, which outer layer is coated by the insulation body 26.

The films 34 and 36 are preferably constructed either in a single layer or a maximum of two layers.

The electrical connection lines are also preferably injected into the insulation body 26. FIG. 4 shows a rough schematic view of a connection line arrangement 86 that is cast into the previously injection-molded insulation body 26. This can take place, for example, in that the film arrangement with intermediate heating track 24 and connection line arrangement 86 already soldered onto this heating track is placed into an injection-molding form and then injection-coated completely with injection-molding mass during the formation of the insulation body 26.

The connection line arrangement 86 preferably comprises, as shown in FIG. 4, two electrical connection lines of which only the one connection line 88 is shown on account of the position of the sectional plane. The other connection line can be located in front of or behind the connection line 88 shown.

Each connection line 88 can be surrounded by an insulation, e.g. of polypropylene or ethylene-propylene-diene rubber (EPDM). The insulation of the individual connection lines 88 is designated in FIG. 4 with 90. The two connection lines 88 can be run in an additional common insulation casing 92 which can also be formed from one of the above-cited materials, polypropylene or EPDM. The space present between the insulation casing 92 and the individual casing 90 can be filled with material, preferably again polypropylene or EPDM in order to avoid a creeping in of operating liquid. The filler material is shown in FIG. 4 in white and designated with 94.

The insulation body 26, which can also be composed, alternatively to the view in FIG. 4, as a shell body consisting of several partial shells, can be connected to the inner wall of the tank shell 12, e.g. by adhering, welding and the like in order to secure a slot space between the insulation body and the inner wall of the tank shell 12 likewise against the entrance of operating liquid 16.

The connection lines 88 are preferably connected in an electrically conductive manner to the contact lines 28 and are run through the tank shell 12.

An entire-surface connection between the films 34 and 36 can also be produced by a vacuum applied between the films 34 and 36—of course after previously having introduced the heating track 24 between the films 34 and 36—so that the joining pressure for the best possible entire-surface connection of the two films 34 and 36 can also be applied by the atmospheric air pressure or another fluid pressure. Again, the connection of the two films 34 and 36 can be achieved under the action of the joining pressure by an appropriate elevation of the temperature, as described above.

Deviating from that which was stated above, the two films 34 and 36 can also be connected to one another over their entire surface without slot areas, wherein the heating track 24 is then placed inside the connection surface in order to prevent operating liquid from reaching the heating track 24.

The heating device 32 is inserted in the ready for operation state either only in the tank volume 14 or only connected at individualized points to the tank shell 12 and fixed to the latter so that the free surfaces of the film 34 as well as of the film 36 can be wetted by operating liquid 16. In this manner the heating device 22 can emit the most effective heat possible to the operating liquid 16.

As a compromise between the best possible screening of the heating track against influences of the operating liquid and the least possible hindering of the emitting of thermal energy from the heating track 24 to the operating liquid 16, film thicknesses in the range of 100 to 300 µm are suggested for the suggested polyolefin films 34 and 36.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A motor vehicle operating liquid tank for storing and discharging an aqueous urea solution, the motor vehicle operating liquid tank comprising a tank shell surrounding a tank volume and a tank opening extending through the tank shell for receiving an associated aqueous urea solution and a removal opening extending through the tank shell for discharging the associated aqueous urea solution, the motor vehicle operating liquid tank further comprising a planar heating device in the tank volume having an electrical resistance heating track which is arranged sandwiched between two parallel plastic films encasing the resistance heating track, wherein the plastic films each comprise a layer of compatible thermoplastic plastics at least on their surfaces facing one another which layers are heat-welded to one another substantially over their entire surfaces in a connection section with the complete inclusion of the resistance heating track, with the exception of those sites of the connection section at which a resistance heating track section is provided, wherein the planar heating device is arranged in the tank volume surrounding at least one of the removal opening and a device cooperating with the removal opening for said discharging of the associated aqueous urea solution,
wherein at least one of a punctiform seam connection and a web-shaped seam connection is formed between the plastic films, and
wherein the at least one of a punctiform seam connection and a web-shaped seam connection carries a fixing means.

2. The motor vehicle operating liquid tank according to claim 1, wherein at least one of the plastic films consists of only one layer of thermoplastic plastic.

3. The motor vehicle operating liquid tank according to claim 1, wherein one plastic film is constructed as a multilayer film laminate whose thermoplastic plastic layer facing the other plastic film and located on the outside relative to the laminate has at least one of a melting and a softening point that is lower, under the same conditions, than another layer.

4. The motor vehicle operating liquid tank according to claim 1, wherein each of the two plastic films is constructed as a multilayer film laminate whose thermoplastic plastic layer facing the other plastic film and located on the outside relative to the laminate has at least one of a melting and a softening point that is lower, under the same conditions, than another layer.

5. The motor vehicle operating liquid tank according to claim 3, wherein at least the other plastic layer directly adjacent to the thermoplastic plastic layer located on the outside and connected to the thermoplastic plastic layer is formed from plastic material that is compatible with the material of the thermoplastic plastic layer located on the outside, which material has at least one of a higher melting point and a higher softening point, under the same conditions, than that of the plastic layer located on the outside.

6. The motor vehicle operating liquid tank according to claim 3, wherein the plastic film comprises exactly two plastic layers.

7. The motor vehicle operating liquid tank according to claim 1, wherein electrical connection lines that extend through or circumvent one of the plastic films for supplying the resistance heating track with electrical energy are guided through an insulation body comprising thermally softenable plastic, the insulation body is connected directly to a perforated or circumvented plastic film and runs away from the perforated or circumvented plastic film.

8. The motor vehicle operating liquid tank according to claim 7, wherein the insulation body is extruded as an injection-molded structural part on the perforated or circumvented plastic film and coats a section of the connection lines in the vicinity of the heating device.

9. The motor vehicle operating liquid tank according to claim 7, wherein the insulation body is composed of two or more partial bodies.

10. The motor vehicle operating liquid tank according to claim 7, wherein the thermally softenable plastic of the insulation body is a polyolefin or a hot adhesive ("hot melt") compatible with the material of the perforated plastic film.

11. The motor vehicle operating liquid tank according to claim 7, wherein the insulation body is connected to the tank shell by its end area remote from the heating device.

12. The motor vehicle operating liquid tank according to claim 7, wherein electrical connection lines that extend through or circumvent one of the plastic films for supplying the resistance heating track with electrical energy are each encased with an insulation at least in a line section located in the tank volume which insulation comprises at least on its outer side a material compatible a material of the perforated or circumvented plastic film.

13. The motor vehicle operating liquid tank according to claim 12, wherein the connection lines have at least in a line section located in the tank volume a common extra insulation on top that surrounds the individually insulated connection lines and their individual insulation and which comprises at least on its outer side a material that is compatible a material of at least one of the perforated plastic film and the insulation body.

14. The motor vehicle operating liquid tank according to claim 13, wherein the space between the extra insulation on top and the individual insulations of the connection lines is filled with a filler material at least in a line section located in the tank volume, which material is compatible with a material of the at least one of the perforated plastic film and the insulation body.

15. The motor vehicle operating liquid tank according to claim 12, wherein the material of at least one of the individual insulation and the extra insulation on top and the filler material is a polyolefin or an ethylene-propylene-diene rubber (EPDM).

16. The motor vehicle operating liquid tank according to claim 2, wherein both of the two plastic films consist of only one layer of thermoplastic plastic.

17. The motor vehicle operating liquid tank according to claim 3, wherein one plastic film is constructed as a multilayer film laminate whose thermoplastic plastic layer facing the other plastic film and located on the outside relative to the laminate has at least one of a melting and a softening point that is lower, under the same conditions, than all other layers of the film laminate.

18. The motor vehicle operating liquid tank according to claim 4, wherein each of the two plastic films is constructed as a multilayer film laminate whose thermoplastic plastic layer facing the other plastic film and located on the outside relative to the laminate has at least one of a melting and a softening point that is lower, under the same conditions, than all other layers of the film laminate.

19. The motor vehicle operating liquid tank according to claim 9, wherein the insulation body is composed of two or more partial shell bodies.

20. The motor vehicle operating liquid tank according to claim 10, wherein the thermally softenable plastic of the insulation body is polypropylene.

21. The motor vehicle operating liquid tank according to claim 15, wherein the material of at least one of the individual insulation and of the extra insulation on top and of the filler material is polypropylene.

22. The motor vehicle operating liquid tank according to claim 1, further including at least one slot area wherein that at least one slot area is provided in the connection section and wherein the parallel plastic films lie opposite one another in an unconnected manner in the at least one slot area without the intermediate arrangement of a section of a resistance heating track between the parallel plastic films.

23. The motor vehicle operating liquid tank according to claim 1, wherein the planar heating device includes a heating device opening, the associated aqueous urea solution flowing through the heating device opening before entering the removal opening.

24. The motor vehicle operating liquid tank according to claim 1, wherein the heating device opening surrounding the at least one of the removal opening and the device cooperating with the removal opening.

25. The motor vehicle operating liquid tank according to claim 1, wherein the fixing means is a cross-shaped opening.

26. The motor vehicle operating liquid tank according to claim 25, wherein the heating device is fastened to the tank shell using the cross-shaped opening.

* * * * *

UNITED STATES PATENT AND TRADEMARK OFFICE
CERTIFICATE OF CORRECTION

PATENT NO. : 10,892,073 B2
APPLICATION NO. : 14/941091
DATED : January 12, 2021
INVENTOR(S) : Fabrizio Chini et al.

It is certified that error appears in the above-identified patent and that said Letters Patent is hereby corrected as shown below:

In the Claims

Column 15, Line 22, Claim 12, the words "compatible a material" should be replaced with --compatible with a material--.

Signed and Sealed this
Fourteenth Day of September, 2021

Drew Hirshfeld
*Performing the Functions and Duties of the
Under Secretary of Commerce for Intellectual Property and
Director of the United States Patent and Trademark Office*